(12) United States Patent
Sarda et al.

(10) Patent No.: US 9,740,520 B1
(45) Date of Patent: Aug. 22, 2017

(54) SYSTEMS AND METHODS FOR VIRTUAL MACHINE BOOT DISK RESTORATION

(71) Applicant: Veritas Technologies LLC, Mountain View, CA (US)

(72) Inventors: Pooja Sarda, Cupertino, CA (US); Dipen Modi, San Jose, CA (US)

(73) Assignee: Veritas Technologies, Mountain View, CA (US)

( * ) Notice: Subject to any disclaimer, the term of this patent is extended or adjusted under 35 U.S.C. 154(b) by 10 days.

(21) Appl. No.: 14/871,037

(22) Filed: Sep. 30, 2015

(51) Int. Cl.
*G06F 11/00* (2006.01)
*G06F 9/455* (2006.01)
*G06F 11/14* (2006.01)

(52) U.S. Cl.
CPC ...... *G06F 9/45558* (2013.01); *G06F 11/1464* (2013.01); *G06F 2009/45575* (2013.01)

(58) Field of Classification Search
CPC .. G06F 11/0712; G06F 9/455; G06F 9/45533; G06F 9/45541; G06F 9/45545; G06F 9/45558; G06F 2009/45575; G06F 9/5077; G06F 11/1402; G06F 11/1446; G06F 11/1448; G06F 11/1458; G06F 11/1464; G06F 11/1469
See application file for complete search history.

(56) References Cited

U.S. PATENT DOCUMENTS

| | | | | |
|---|---|---|---|---|
| 7,831,861 B1 * | 11/2010 | Greene | ............... | G06F 11/1469 707/685 |
| 8,560,825 B2 * | 10/2013 | Butler | ............... | G06F 9/4416 713/2 |
| 8,819,369 B1 * | 8/2014 | Alappat | ............ | G06F 17/30088 707/640 |
| 8,874,888 B1 * | 10/2014 | Beda, III | .............. | G06F 9/4416 709/222 |
| 8,984,325 B2 | 3/2015 | Garai et al. | | |
| 9,037,821 B1 | 5/2015 | Shah et al. | | |
| 9,052,935 B1 | 6/2015 | Rajaa | | |
| 9,336,131 B1 * | 5/2016 | Sabjan | .................... | G06F 12/02 |

(Continued)

OTHER PUBLICATIONS

Santosh Kalekar, et al.; Systems and Methods for File-Level Replication; U.S. Appl. No. 13/646,858, filed Oct. 8, 2012.

(Continued)

*Primary Examiner* — Gabriel Chu
(74) *Attorney, Agent, or Firm* — FisherBroyles LLP

(57) ABSTRACT

A computer-implemented method for virtual machine boot disk restoration may include (1) identifying a hypervisor that hosts at least one virtual machine, where a replication system is configured to replicate virtual machine data stored by the virtual machine, including a virtual machine boot disk used by the virtual machine, to a data repository that is separate from the hypervisor, (2) determining that the replication system is to restore the replicated virtual machine data back to the hypervisor for the virtual machine, including boot disk data replicated from the virtual machine boot disk, (3) attaching, at the hypervisor, the virtual machine boot disk to a storage proxy virtual machine hosted by the hypervisor, and (4) restoring, from the replication system and via the storage proxy virtual machine, the boot disk data back to the virtual machine boot disk. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2009/0260007 | A1* | 10/2009 | Beaty | G06F 9/5077 |
| | | | | 718/1 |
| 2011/0238969 | A1* | 9/2011 | Warkentin | G06F 9/441 |
| | | | | 713/2 |
| 2014/0040892 | A1* | 2/2014 | Baset | G06F 9/455 |
| | | | | 718/1 |
| 2014/0359617 | A1* | 12/2014 | Fontignie | G06F 8/65 |
| | | | | 718/1 |
| 2015/0269029 | A1* | 9/2015 | Smith | G06F 11/1435 |
| | | | | 714/15 |
| 2016/0364257 | A1* | 12/2016 | Graf | G06F 3/0683 |
| 2017/0010908 | A1* | 1/2017 | Matzek | G06F 9/45558 |

OTHER PUBLICATIONS

Hari Krishna Vemuri; Systems and Methods for Attributing Input/Output Statistics in Storage Area Networks to Region-Mapped Entities; U.S. Appl. No. 13/947,780, filed Jul. 22, 2013.

\* cited by examiner

SYSTEMS AND METHODS FOR VIRTUAL MACHINE BOOT DISK RESTORATION

BACKGROUND

Organizations increasingly rely on virtualization technologies to improve the flexibility, efficiency, and stability of their data centers. For example, virtual machines may facilitate business continuity and disaster recovery. Business continuity and disaster recovery refers to the capability to restore normal (or near-normal) business operations, from a critical business application perspective, after the occurrence of a disaster that interrupts business operations. For example, an enterprise may replicate virtual machine data to a disaster recovery data center and then, in the event of a disruption, quickly restore the virtual machine data from the disaster recovery data center.

Unfortunately, configuring and maintaining replication and recovery systems for virtual-machine-based data centers may be complex. For example, in addition to primary data volumes, replication and recovery systems may also protect and restore virtual machine boot disks. However, restoring data to the boot disk of a virtual machine through the virtual machine itself may prove impractical. On the other hand, restoring data to the boot disk of a virtual machine through direct operations to the storage of the hosting hypervisor may prove cumbersome, potentially requiring re-zoning of storage by storage administrators.

Accordingly, the instant disclosure identifies and addresses a need for additional and improved systems and methods for virtual machine boot disk restoration.

SUMMARY

As will be described in greater detail below, the instant disclosure generally relates to systems and methods for virtual machine boot disk restoration by attaching virtual machine boot disks to a storage proxy on a hypervisor and exposing the virtual machine boot disks as storage targets to a replication system via the storage proxy.

In one example, a computer-implemented method for virtual machine boot disk restoration may include (1) identifying a hypervisor that hosts at least one virtual machine, where a replication system is configured to replicate virtual machine data stored by the virtual machine, including a virtual machine boot disk used by the virtual machine, to a data repository that is separate from the hypervisor, (2) determining that the replication system is to restore the replicated virtual machine data back to the hypervisor for the virtual machine, including boot disk data replicated from the virtual machine boot disk, (3) attaching, at the hypervisor, the virtual machine boot disk to a storage proxy virtual machine hosted by the hypervisor, and (4) restoring, from the replication system and via the storage proxy virtual machine, the boot disk data replicated from the virtual machine boot disk back to the virtual machine boot disk.

In one embodiment, the replication system may lack direct access via a storage area network to a storage device that stores the virtual machine boot disk for the hypervisor.

In one embodiment, the replication system may be configured to replicate virtual machine data stored by the virtual machine by communicating with the virtual machine.

In one embodiment, the virtual machine may be offline when the replication system is to restore the replicated virtual machine data back to the hypervisor for the virtual machine, preventing the replication system from restoring at least a portion of the replicated virtual machine data via communication with the virtual machine.

In one embodiment, attaching, at the hypervisor, the virtual machine boot disk to the storage proxy virtual machine hosted by the hypervisor may include bringing the storage proxy virtual machine online in response to determining that the replication system is to restore the replicated virtual machine data back to the hypervisor for the virtual machine.

In one embodiment, (1) the hypervisor may host a group of virtual machines, (2) the replication system may be configured to replicate virtual machine data for each of the virtual machines, including a group of virtual machine boot disks, (3) attaching the virtual machine boot disk to the storage proxy virtual machine may include attaching the group of virtual machine boot disks to the storage proxy virtual machine.

In one embodiment, the computer-implemented method may further include (1) bringing the virtual machine online after restoring the boot disk data to the virtual machine boot disk and (2) restoring at least a portion of the replicated virtual machine data from the replication system by communicating directly with the virtual machine.

In one embodiment, the computer-implemented method may further include restoring, from the replication system and via the storage proxy virtual machine, an additional portion of the replicated virtual machine data to an additional virtual machine disk.

In one embodiment, attaching, at the hypervisor, the virtual machine boot disk to the storage proxy virtual machine hosted by the hypervisor may include creating, according to a storage networking protocol used by the replication system, a logical volume that maps onto the virtual machine boot disk.

In one embodiment, attaching, at the hypervisor, the virtual machine boot disk to the storage proxy virtual machine hosted by the hypervisor may include connecting the virtual machine boot disk to the storage proxy virtual machine with a virtual storage interface adapter.

In one embodiment, a system for implementing the above-described method may include (1) an identification module, stored in memory, that identifies a hypervisor that hosts at least one virtual machine, where a replication system is configured to replicate virtual machine data stored by the virtual machine, including a virtual machine boot disk used by the virtual machine, to a data repository that is separate from the hypervisor, (2) a determination module, stored in memory, that determines that the replication system is to restore the replicated virtual machine data back to the hypervisor for the virtual machine, including boot disk data replicated from the virtual machine boot disk, (3) an attachment module, stored in memory, that attaches, at the hypervisor, the virtual machine boot disk to a storage proxy virtual machine hosted by the hypervisor, (4) a restoration module, stored in memory, that restores, from the replication system and via the storage proxy virtual machine, the boot disk data replicated from the virtual machine boot disk back to the virtual machine boot disk, and (5) at least one physical processor configured to execute the identification module, the determination module, the attachment module, and the restoration module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a hypervisor that hosts at least one virtual machine, where a replication system is configured to replicate virtual machine data stored by the virtual machine, including a virtual machine boot disk used by the virtual machine, to a data repository that is separate from the hypervisor, (2) determine that the replication system is to restore the replicated virtual machine data back to the hypervisor for the virtual machine, including boot disk data replicated from the virtual machine boot disk, (3) attach, at the hypervisor, the virtual machine boot disk to a storage proxy virtual machine hosted by the hypervisor, and (4) restore, from the replication system and via the storage proxy virtual machine, the boot disk data replicated from the virtual machine boot disk back to the virtual machine boot disk.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
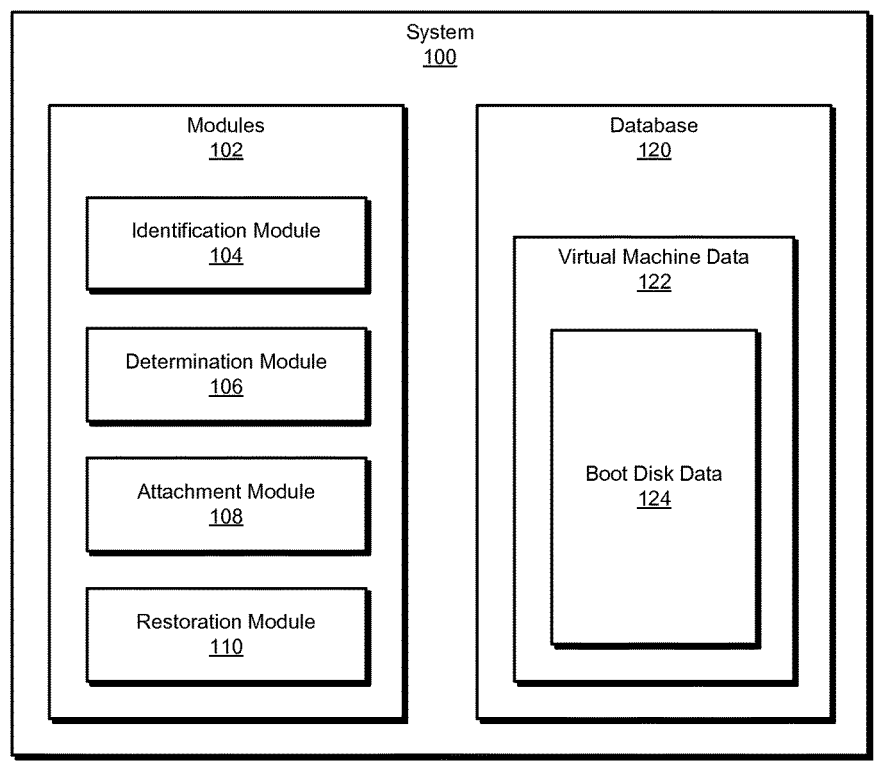
FIG. 1 is a block diagram of an exemplary system for virtual machine boot disk restoration.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for virtual machine boot disk restoration. As will be explained in greater detail below, by attaching virtual machine boot disks to a storage proxy on a hypervisor and exposing the virtual machine boot disks as storage targets to a replication system via the storage proxy, the systems and methods described herein may facilitate the full recovery of virtual machine data (including virtual machine boot disks) even where replication systems lack permissions to directly access (e.g., through a storage area network (SAN)) storage where the virtual machine boot disks are stored. In addition, these systems and methods may function without requiring storage administrators to re-zone storage systems. Furthermore, these systems and methods may function in a variety of environments, e.g., without regard to specific operating systems, hypervisors, or cloud-computing platforms. Additionally these systems and methods may function without the use of software-defined networks.

The following will provide, with reference to FIGS. 1-2 and 4-5, detailed descriptions of exemplary systems for virtual machine boot disk restoration. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for virtual machine boot disk restoration. As illustrated in this figure, exemplary system 100 may include one or more modules 102 for performing one or more tasks. For example, and as will be explained in greater detail below, exemplary system 100 may include an identification module 104 that identifies a hypervisor that hosts at least one virtual machine, where a replication system is configured to replicate virtual machine data stored by the virtual machine, including a virtual machine boot disk used by the virtual machine, to a data repository that is separate from the hypervisor. Exemplary system 100 may additionally include a determination module 106 that determines that the replication system is to restore the replicated virtual machine data back to the hypervisor for the virtual machine, including boot disk data replicated from the virtual machine boot disk. Exemplary system 100 may also include an attachment module 108 that attaches, at the hypervisor, the virtual machine boot disk to a storage proxy virtual machine hosted by the hypervisor. Exemplary system 100 may additionally include a restoration module 110 that restores, from the replication system and via the storage proxy virtual machine, the boot disk data replicated from the virtual machine boot disk back to the virtual machine boot disk. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., hypervisor 202 and/or replication system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store virtual machine data (e.g., data stored by, generated by, and/or accessed by virtual machines).

Database 120 may represent portions of a single database or computing device or a plurality of databases or computing devices. For example, database 120 may represent a portion of hypervisor 202 in FIG. 2, replication system 206 in FIG. 2, data repository 208 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as hypervisor 202 in FIG. 2, replication system 206 in FIG. 2, data repository 208 in FIG. 2, computing system 610 in FIG. 6, and/or portions of exemplary network architecture 700 in FIG. 7.

Figure 2:
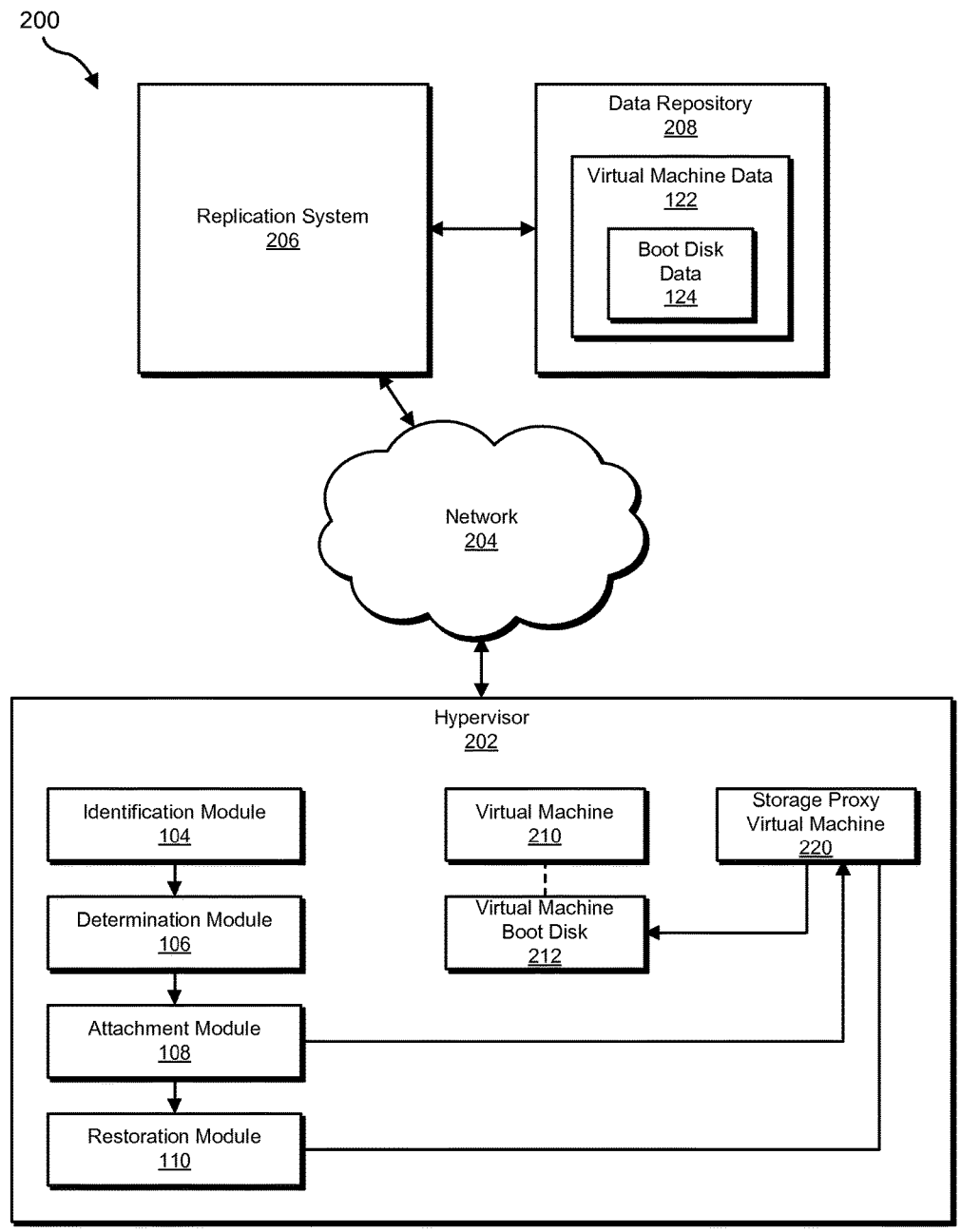
FIG. 2 is a block diagram of an additional exemplary system for virtual machine boot disk restoration.

Exemplary system 100 in FIG. 1 may be implemented in a variety of ways. For example, all or a portion of exemplary system 100 may represent portions of exemplary system 200 in FIG. 2. As shown in FIG. 2, system 200 may include a hypervisor 202 in communication with a server 206 via a network 204. In one example, hypervisor 202 may be programmed with one or more of modules 102 and/or may store all or a portion of the data in database 120. Additionally or alternatively, replication system 206 may be programmed with one or more of modules 102 and/or may store all or a portion of the data in database 120.

In one embodiment, one or more of modules 102 from FIG. 1 may, when executed by at least one processor of hypervisor 202 and/or replication system 206, enable hypervisor 202 and/or replication system 206 to restore virtual machine boot disk data. For example, and as will be described in greater detail below, one or more of modules 102 may cause hypervisor 202 and/or replication system 206 to restore virtual machine boot disk data. For example, and as will be described in greater detail below, identification module 104 may identify a hypervisor 202 that hosts at least one virtual machine 210, where a replication system 206 is configured to replicate virtual machine data 122 stored by virtual machine 210, including a virtual machine boot disk 212 used by virtual machine 210, to a data repository 208 that is separate from hypervisor 202. Determination module 106 may determine that replication system 206 is to restore the replicated virtual machine data 122 back to hypervisor 202 for virtual machine 210, including boot disk data 124 replicated from virtual machine boot disk 212. Attachment module 108 may attach, at hypervisor 202, virtual machine boot disk 212 to a storage proxy virtual machine 220 hosted by hypervisor 202. Restoration module 110 may restore, from replication system 206 and via storage proxy virtual machine 220, boot disk data 124 replicated from virtual machine boot disk 212 back to virtual machine boot disk 212.

Hypervisor 202 generally represents any type or form of virtualization platform capable of running and/or managing multiple virtual machines (e.g., on a single physical computing device). Examples of hypervisor 202 include, without limitation, native hypervisors, hosted hypervisors, exemplary computing system 610 in FIG. 6, or any other suitable computing device.

Replication system 206 generally represents any type or form of computing device that is capable of facilitating, directing, managing, and/or routing one or more replication and/or restoration operations. Examples of replication system 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), a Storage Area Network (SAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between hypervisor 202 and replication system 206.

Figure 3:
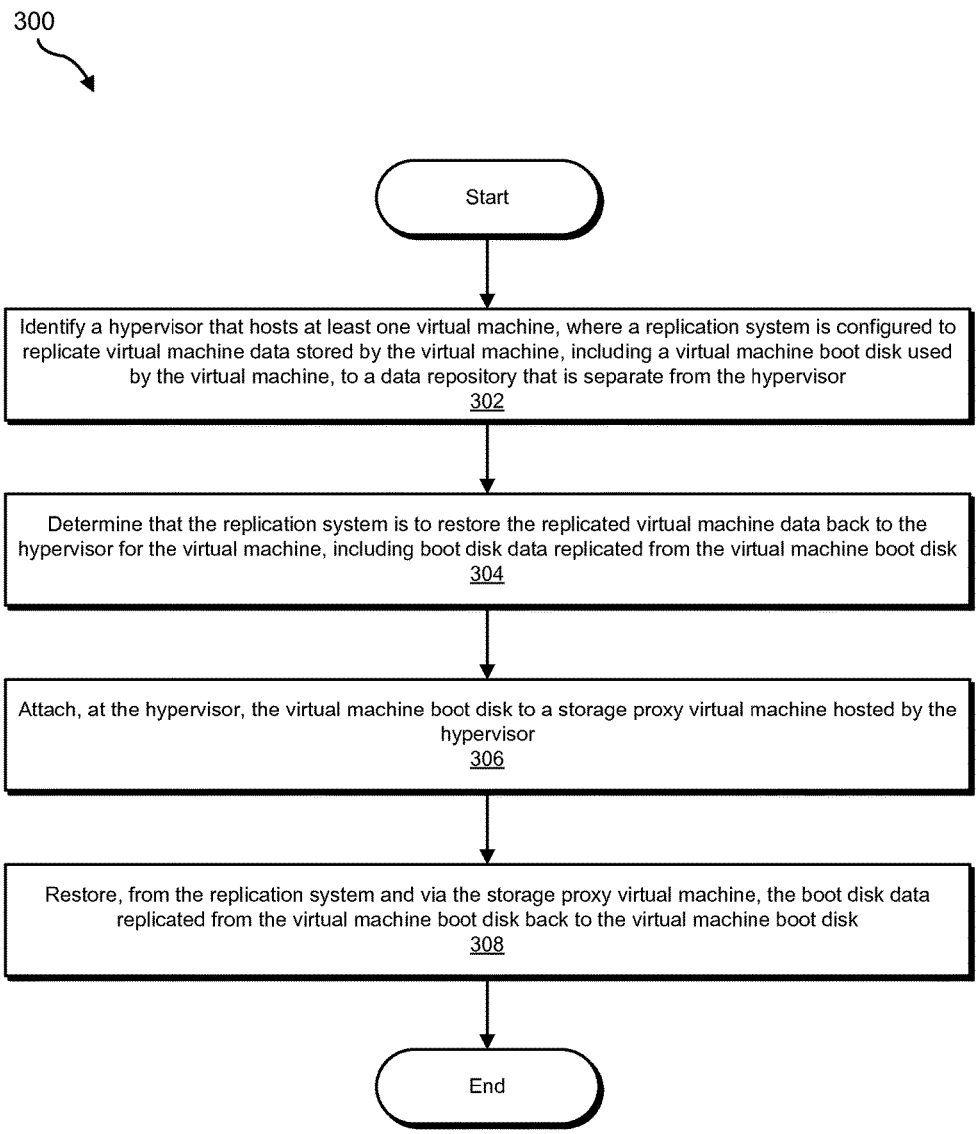
FIG. 3 is a flow diagram of an exemplary method for virtual machine boot disk restoration.

FIG. 3 is a flow diagram of an exemplary computer-implemented method 300 for virtual machine boot disk restoration. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a hypervisor that hosts at least one virtual machine, where a replication system is configured to replicate virtual machine data stored by the virtual machine, including a virtual machine boot disk used by the virtual machine, to a data repository that is separate from the hypervisor. For example, identification module 104 may, as part of hypervisor 202 in FIG. 2, identify hypervisor 202 that hosts at least one virtual machine 210, where replication system 206 is configured to replicate virtual machine data 122 stored by virtual machine 210, including virtual machine boot disk 212 used by virtual machine 210, to data repository 208 that is separate from hypervisor 202.

As used herein, the term "hypervisor" may refer to any type or form of virtualization platform capable of running and/or managing multiple virtual machines (e.g., on a single physical computing device). Examples of hypervisors include, without limitation, VMWARE ESX/ESXI, MICROSOFT HYPER-V, ORACLE VM, SUN VIRTUALBOX, CITRIX XENSERVER, any bare-metal hypervisor, and/or any hosted hypervisor. In some examples, the term "hypervisor" may refer to software executing on a physical computing device that manages the execution of virtual machines on the physical computing device and/or the physical computing device itself. As used herein, the phrase "virtual machine" generally refers to any operating system environment that is abstracted from computing hardware by a hypervisor.

As used herein, the term "virtual machine disk" (or "virtual disk") may refer to any data structure that may be interpreted by a virtual machine as a disk, volume, and/or physical storage medium (e.g., a solid-state storage device). For example, the term "virtual disk" may refer to a VMWARE VIRTUAL MACHINE DISK ("VMDK"). The term "boot disk," as used herein, generally refers to may refer to any disk, volume, and/or storage medium from which a computing system may initialize (e.g., bootstrap into executing an operating system). Accordingly, the term "virtual machine boot disk" may refer to any data structure that may be interpreted and/or used by a virtual machine as a boot disk.

As used herein, the term "replication" may refer to any scheme for creating and/or maintaining a copy of a collection of data. In some examples, "replication" may refer to periodic replication (e.g., maintaining a copy of a collection of data that is updated to a point-in-time on a periodic basis). In some examples, "replication" may refer to continuous replication. As used herein, the phrase "continuous replication" may refer to any scheme for providing continuous and/or real-time replication (e.g., by replicating each transaction and/or operation synchronously and/or near-synchronously). The term "replication system," as used herein, generally refers any system that performs, facilitates, and/or directs replication and/or one or more replication operations. In some examples, the replication system may operate as a part of a replication network. In some examples, the replication system may include and/or operate as a part of a replication gateway (e.g., to direct replication across a network). In some examples, the replication system may operate from outside the hypervisor. Additionally or alternatively, the replication system may operate from inside the hypervisor (e.g., from within a storage proxy virtual machine, in a different virtual machine, and/or directly on the hypervisor as a part of the hypervisor implementation). In one example, a replication gateway may operate from outside the hypervisor. In some examples, a replication gateway operating outside the hypervisor may provide replication services to multiple hypervisors.

The term "data repository," as used herein, generally refers to system and/or location for storing data. For example, the data repository may store one or more replicas of virtual machine data (e.g., virtual machine disks). In some examples, the data repository include and/or be included within a disaster recovery data center. In some examples, the term "disaster recovery" may refer to a recovery of an application, data collection, and/or computing system (e.g., a virtual machine) after an unplanned event (e.g., a disaster such as the failure of one or more computing devices, a data corruption event, the loss of power at a computing facility, etc.). In some examples, a disaster recovery data center may be located apart from the location of the primary systems whose data the disaster recovery data center preserves in order to reduce the likelihood of a single unplanned event impacting both the protected primary systems and the disaster recovery data center.

Identification module 104 may identify the hypervisor in any of a variety of contexts. For example, identification module 104 may identify the hypervisor from an agent operating within a storage proxy virtual machine. Additionally or alternatively, identification module 104 may identify the hypervisor by executing on the hypervisor and/or as a part of the hypervisor. In some examples, identification module 104 may identify the hypervisor by receiving an instruction and/or reading a configuration that identifies the hypervisor. Additionally or alternatively, identification module 104 may identify the hypervisor by identifying a virtual machine hosted by the hypervisor and/or a virtual machine disk managed by the hypervisor.

In some examples, the virtual machine may connect to multiple virtual disks (including, e.g., the boot disk). However, in some examples, the number of disks to which the virtual machine may connect may be limited (e.g., by restrictions imposed by an interface and/or standard used by the virtual machine to connect to the disks). For example, the virtual machine may connect to the virtual disks according to the AT Attachment (ATA) standard and/or using an interface analogous to an Integrated Drive Electronics (IDE) interface. In one example, the virtual machine may be limited to connecting to four disks according to an interface standard used by the virtual machine. As another example, the virtual machine may connect to one or more of the virtual disks according to a Small Computer System Interface (SCSI) standard.

In one embodiment, the replication system may lack direct access via a storage area network to a storage device that stores the virtual machine boot disk for the hypervisor. For example, a SAN may implement zoning that restricts one or more systems with access to the SAN from accessing one or more devices and/or ports via the SAN. For example, one or more SAN switches may be configured to restrict communication between one or more devices and/or ports via the SAN. However, as explained herein, reconfiguring a SAN to allow, for example, one or more replication systems to directly access storage used by one or more hypervisors may be cumbersome and/or administratively difficult (e.g., requiring the coordination of administrators of different domains), may give rise to opportunities for human error, may present scaling difficulties, and/or may fail to meet a desired security objective (e.g., due to a low security granularity, due to an increased attack surface, and/or by failing to meet a pre-defined security protocol and/or agreement). Accordingly, as will be explained in greater detail below, the systems and methods described herein may facilitate the restoration of virtual machine boot disks via a storage proxy virtual machine.

The replication system may be configured to replicate the virtual machine data stored by the virtual machine in any suitable manner. For example, the replication system may be configured to replicate virtual machine data stored by the virtual machine by communicating with the virtual machine. In some examples, the replication system may communicate with a guest system operating within the virtual machine. Additionally or alternatively, the replication system may communicate with an agent operating within the virtual machine. In some examples, the replication system may establish a virtual network connection with a guest system operating within the virtual machine. By replicating the virtual machine data via the virtual machine, in some examples the guest system within the virtual machine may coordinate with the replication (e.g., to improve the efficiency of the replication, to perform granular and/or application-aware replication operations within the guest system, to implement the replication within a broader data protection scheme, and/or to apply one or more security policies to the replicated data).

Figure 4:
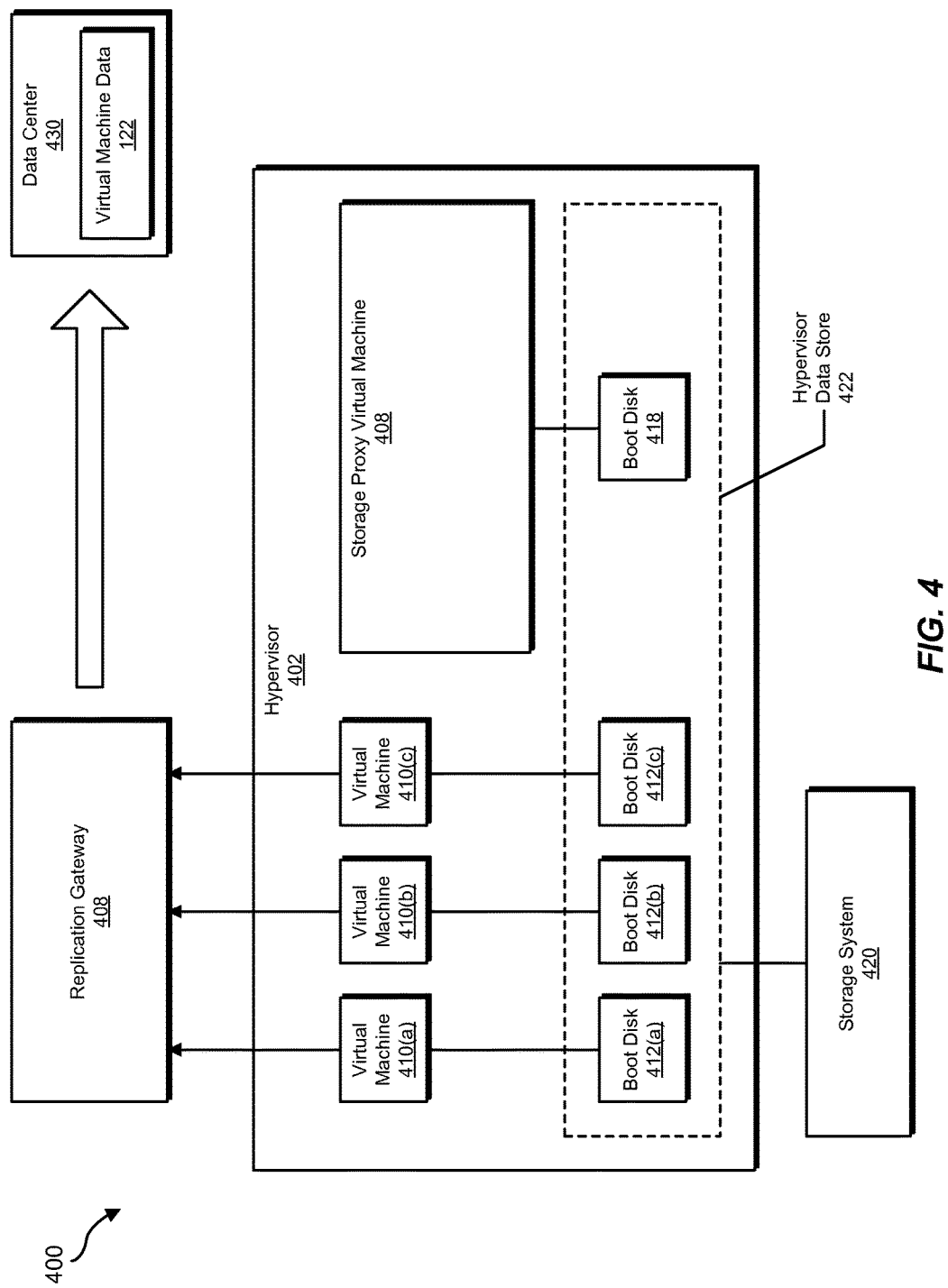
FIG. 4 is a block diagram of an exemplary computing system for virtual machine boot disk restoration.

To provide an example of the replication of virtual machine data, FIG. 4 illustrates an exemplary system 400. As shown in FIG. 4, system 400 may include a hypervisor 402 that hosts virtual machines 410(*a*)-(*c*) with respective boot disks 412(*a*)-(*c*). Hypervisor 402 may also host a storage proxy virtual machine 408 with a boot disk 418. Boot disks 412(*a*)-(*c*) and 418 may be stored within a hypervisor data store 422, which may in turn be provisioned by a storage system 420 (e.g., connected to hypervisor 402). System 400 may also include a replication gateway 408, which may replicate data stored and/or accessed by virtual machines 410(*a*)-(*c*), including, e.g., boot disks 412(*a*)-(*c*). As an example, replication gateway 408 may replicate virtual machine data 122 to a data center 430 (e.g., at a location remote from hypervisor 402). Virtual machine data 122 may include boot disks 412(*a*)-(*c*). In some examples, replication gateway 408 may replicate boot disks 412(*a*)-(*c*) via virtual machines 410(*a*)-(*c*) (instead of, e.g., directly accessing hypervisor data store 422 and/or storage system 420). In some examples, replication gateway 408 may not have direct access to hypervisor data store 422 and/or storage system 420.

Returning to FIG. 3, at step 304, one or more of the systems described herein may determine that the replication system is to restore the replicated virtual machine data back to the hypervisor for the virtual machine, including boot disk data replicated from the virtual machine boot disk. For example, determination module 106 may, as part of hypervisor 202 in FIG. 2, determine that replication system 206 is to restore the replicated virtual machine data 122 back to hypervisor 202 for virtual machine 210, including boot disk data 124 replicated from virtual machine boot disk 212.

Determination module 106 may determine that the replication system is to restore the replicated virtual machine data back to the hypervisor for the virtual machine in any of a variety of contexts. For example, determination module 106 may identify and/or receive an instruction relating to a data recovery scenario. For example, determination module 106 may determine that one or more systems upon which the virtual machine relied temporarily failed and/or that the virtual machine data was lost and/or corrupted. In some examples, determination module 106 may operate as a part of the replication system. Additionally or alternatively, determination module 106 may operate as a part of the hypervisor. In some examples, determination module 106 may operate as a part of a storage proxy virtual machine.

In some examples, the virtual machine may be offline when the replication system is to restore the replicated virtual machine data back to the hypervisor for the virtual machine. This may prevent the replication system from restoring at least a portion of the replicated virtual machine data via communication with the virtual machine. For example, the virtual machine may have stopped operation due to a fault and/or may have been shut down (e.g., in anticipation of the restoration of the replicated virtual machine data). Accordingly, in some examples, the virtual machine may remain offline until the virtual machine has bootstrapped a guest system within the virtual machine by using the boot disk. In these examples, the replication system may be unable to restore the boot disk via the virtual machine because the virtual machine may require that the boot disk be restored before bootstrapping and may require bootstrapping before communicating with other systems (such as the replication system).

Returning to FIG. 3, at step 306, one or more of the systems described herein may attach, at the hypervisor, the virtual machine boot disk to a storage proxy virtual machine hosted by the hypervisor. For example, attachment module 108 may, as part of hypervisor 202 in FIG. 2, attach, at hypervisor 202, virtual machine boot disk 212 to storage proxy virtual machine 220 hosted by hypervisor 202.

As used herein, the term "storage proxy virtual machine" may refer to any virtual machine used as a proxy for one or more storage operations to be performed on data and/or virtual disks pertaining to one or more different virtual machines. For example, the storage proxy virtual machine may expose to the replication system a storage target that corresponds to the boot disk of the virtual machine that is being restored.

Attachment module 108 may attach the virtual machine boot disk to the storage proxy virtual machine in any of a variety of contexts. For example, attachment module 108 may attach, at the hypervisor, the virtual machine boot disk to the storage proxy virtual machine hosted by the hypervisor by first bringing the storage proxy virtual machine online in response to determining that the replication system is to restore the replicated virtual machine data back to the hypervisor for the virtual machine. For example, attachment module 108 may activate the storage proxy virtual machine on an as-needed basis (e.g., when a restoration operation is to take place). In other examples, the storage proxy virtual machine may normally stay online (e.g., in preparation for a restoration operation and/or to perform other auxiliary functions at the hypervisor).

In some examples, the hypervisor may host a plurality of virtual machines. In these examples, the replication system may be configured to replicate virtual machine data for each of the virtual machines, including virtual machine boot disks for the virtual machines. Accordingly, attachment module 108 may attach each of the virtual machine boot disks to the storage proxy virtual machine (e.g., simultaneously). In some examples, attachment module 108 may attach the virtual machine boot disks to the storage proxy virtual machine using a SCSI interface standard. In this manner, attachment module 108 may successfully attach a large number of virtual machine boot disks to the storage proxy virtual machine (instead of, e.g., being limited to a relatively small number of disks, such as four, by using an ATA interface standard). In some examples, the virtual machine boot disks may be configured according to a different interface standard than that used by the storage proxy virtual machine. In these examples, attachment module 108 may attach, at the hypervisor, the virtual machine boot disk to the storage proxy virtual machine hosted by the hypervisor by connecting the virtual machine boot disk to the storage proxy virtual machine with a virtual storage interface adapter. For example, the virtual machine boot disks may be configured according to a non-SCSI interface standard (e.g., an ATA interface standard). In these examples, attachment module 108 may use a virtual storage interface adapter (e.g., based on determining that the virtual machine boot disks are not configured to use a SCSI interface) to connect the virtual machine boot disks to the storage proxy virtual machine (e.g., using a SCSI interface). In this manner, the storage proxy virtual machine may be able to operate as a storage proxy for many (e.g., more than four) virtual machine boot disks.

Attachment module 108 may attach the virtual machine boot disk to the storage proxy virtual machine in any of a variety of ways. In some examples, attachment module 108 may create, according to a storage networking protocol used by the replication system, a logical volume that maps onto the virtual machine boot disk. For example, attachment module 108 may present the virtual machine boot disk to the replication system as an Internet Small Computer System Interface (iSCSI) virtual disk. In some examples, attachment module 108 may identify a unique identifier of the virtual machine boot disk. For example, attachment module 108 may identify a Globally Unique Identifier (GUID) used by the hypervisor to uniquely identifier the virtual machine boot disk and/or the virtual machine to which the virtual machine boot disks corresponds. Attachment module 108 may then associate the unique identifier with the logical volume exposed to the replication system. In this manner, the replication system may, upon identifying the logical volume, determine the virtual machine and/or the virtual machine boot disk to which the logical volume corresponds. In some examples, attachment module 108 may also provide the replication system with credentials to discover and/or connect to the logical volume.

Returning to FIG. 3, at step 308, one or more of the systems described herein may restore, from the replication system and via the storage proxy virtual machine, the boot disk data replicated from the virtual machine boot disk back to the virtual machine boot disk. For example, restoration module 110 may, as part of hypervisor 202 in FIG. 2, restore, from replication system 206 and via storage proxy virtual machine 220, boot disk data 124 replicated from virtual machine boot disk 212 back to virtual machine boot disk 212.

Restoration module 110 may restore the boot disk data to the virtual machine boot disk in any suitable manner. For example, restoration module 110 may, as a part of the replication system and/or the storage proxy virtual machine, receive the boot disk data from the data repository and write the boot disk data to the virtual machine boot disk via the storage proxy virtual machine.

In some examples, restoration module 110 may restore additional virtual machine data to the virtual machine (e.g., beyond the boot disk data). For example, restoration module 110 may restore data corresponding to one or more additional virtual disks used by the virtual machine. In some examples, restoration module 110 may restore data to one or more virtual disks storing primary data and/or application data for the virtual machine.

Restoration module 110 may restore additional virtual machine data (e.g., primary and/or application data not stored on the boot disk) to the virtual machine in any suitable manner. For example, restoration module 110 may bring the virtual machine online (e.g., after bootstrapping a guest system within the virtual machine by using the restored boot disk) after restoring the boot disk data to the virtual machine boot disk and restore at least a portion of the replicated virtual machine data from the replication system by communicating directly with the virtual machine. By restoring the virtual machine data via the virtual machine, in some examples a guest system within the virtual machine may coordinate with the restoration (e.g., to improve the efficiency of the restoration, to perform granular and/or application-aware restoration operations within the guest system, to implement the restoration within a broader data protection scheme, and/or to apply one or more security policies to the restored data).

In some examples, restoration module 110 may restore additional virtual machine data (e.g., primary and/or application data not stored on the boot disk) to the virtual machine via the storage proxy virtual machine. For example, restoration module 110 may restore, from the replication system and via the storage proxy virtual machine, an additional portion of the replicated virtual machine data to an additional virtual machine disk. In some examples, restoration module 110 may restore the additional virtual machine data to the additional virtual machine disk before the virtual machine is brought online.

Figure 5:
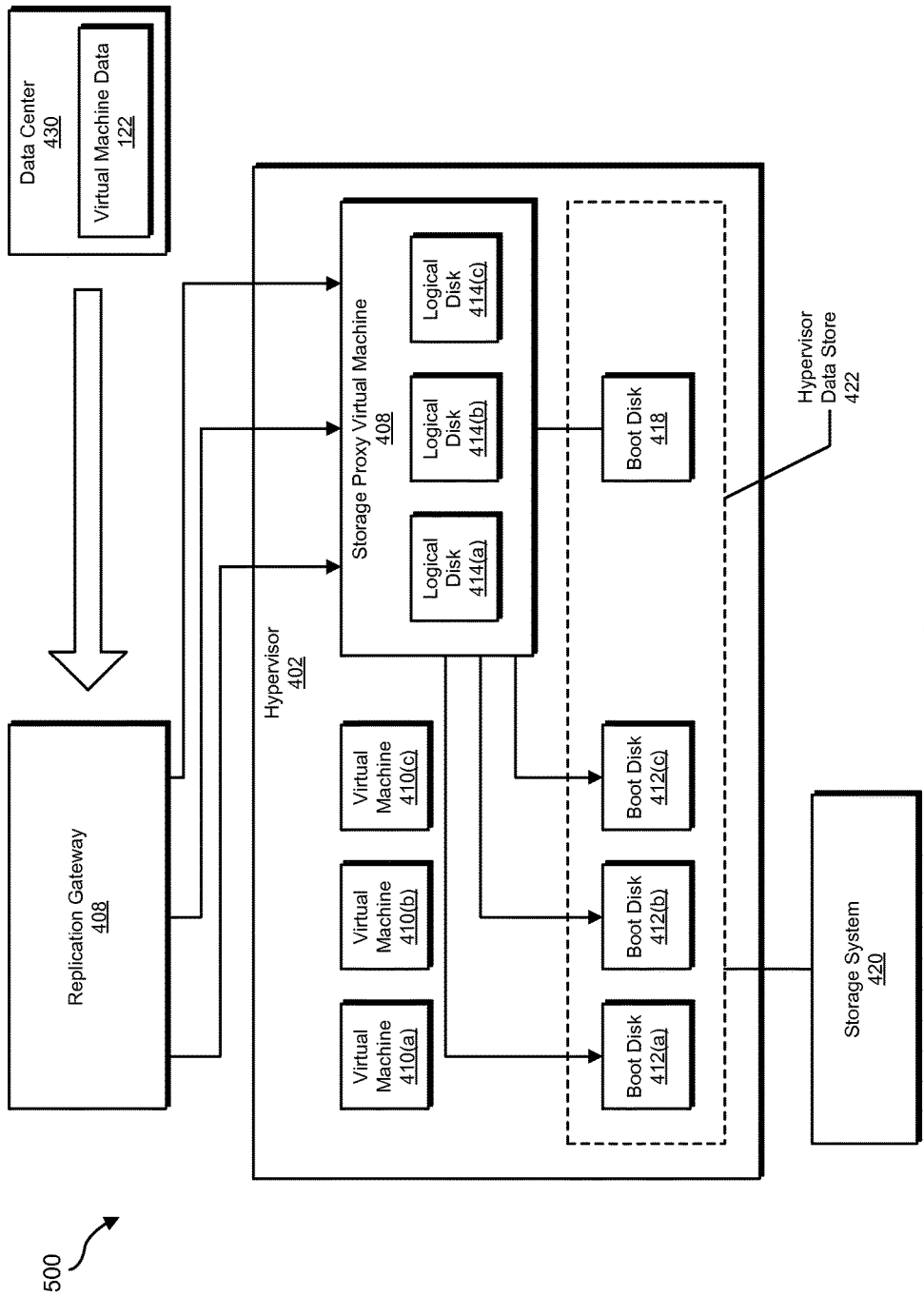
FIG. 5 is a block diagram of an exemplary computing system for virtual machine boot disk restoration.

To provide an example of the restoration of virtual machine data, FIG. 5 illustrates an exemplary system 500. As shown in FIG. 5, storage proxy virtual machine 408 may include logical disks 414(a)-(c) that map to respective boot disks 412(a)-(c). Storage proxy virtual machine 408 may expose logical disks 414(a)-(c) to replication gateway 408 (e.g., as iSCSI disks). In some examples, virtual machines 410(a)-(c) may be offline (e.g., due to an incident that preceded the restoration of the virtual machine data and/or in order to allow for the restoration of the virtual machine data). Accordingly, replication gateway 408 may restore (e.g., from data center 430) boot disks 412(a)-(c) via storage proxy virtual machine 408. In some examples, virtual machines 410(a)-(c) may be offline while restoration module 110 restores boot disks 412(a)-(c). After restoration module 110 restores boot disks 412(a)-(c), virtual machines 410(a)-(c) may make use of respective boot disks 412(a)-(c) for bootstrapping systems within virtual machines 410(a)-(c).

As explained above in connection with method 300 in FIG. 3, the systems and methods described herein may provide a hypervisor- and operating-system-agnostic way of replicating boot disks by attaching multiple IDE/SCSI boot disks as SCSI disks to a storage proxy. The storage proxy may export an iSCSI target for writing the replicated data without requiring primary storage reconfiguration. Accordingly, these systems and methods may attach virtual disks that are attached to replicated virtual machines to a storage proxy virtual machine. All the disks may be attached on a SCSI controller (thereby overcoming limits to the number of disks that may be imposed by IDE disks). The storage proxy may export the virtual disks as iSCSI logical units (LUNs), clubbing all disks that belong to a virtual machine under one target. This may allow one or more of the systems described herein to write onto the boot disks via the storage proxy.

When virtual machine in a production data center are up and running, boot disks may be attached to the respective virtual machines. Following a disaster event, the virtual machines in a disaster recovery remote data center may be brought up. Any (block-level) writes that go to the application disks and/or boot disks in the remote data center may be transferred to and written on the production data center to provide zero-loss replication on a failback. As a preparatory task of failback, a designated virtual machine (e.g., a storage proxy virtual machine) may be brought up. The replicated virtual machines may remain shut down. The storage proxy virtual machine may use a suitable operating system (e.g., a LINUX operating system) with a suitable storage configuration (e.g., an iSCSI target driver). All the virtual disks that belong to the replicated virtual machines may be attached to the storage proxy on SCSI controllers. To this end, the systems and methods described herein may access the hypervisor and/or use an adapter as required. In the storage proxy virtual machine, a script may execute to create an iSCSI LUN with the virtual disks as the backend to the LUN. The replication gateway may include an iSCSI client as well as credentials to discover and connect to the iSCSI target/LUNs. Once the replication gateway connects, systems described herein may write the replicated data onto the replicated virtual machine disks.

Figure 6:
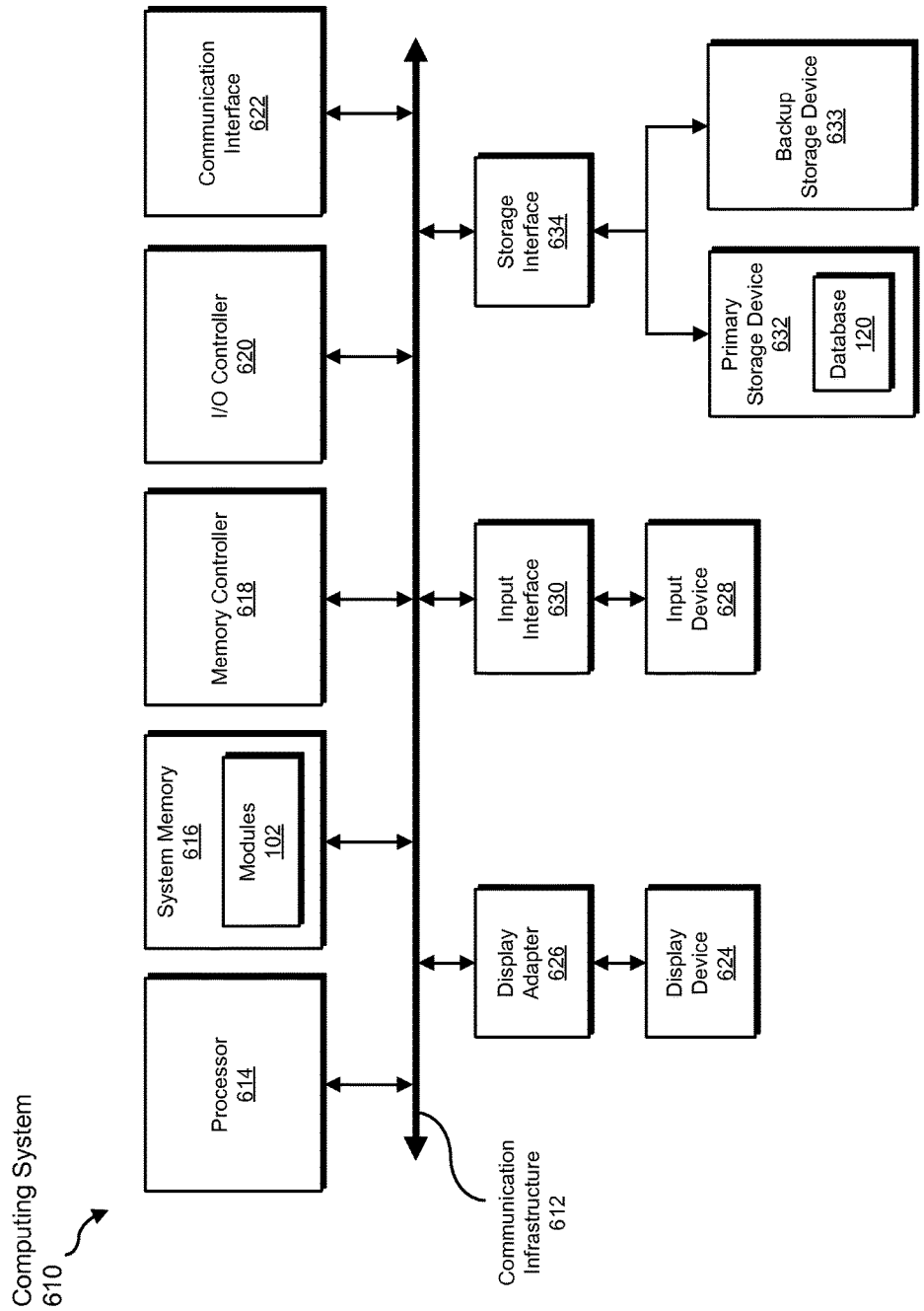
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations.

For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
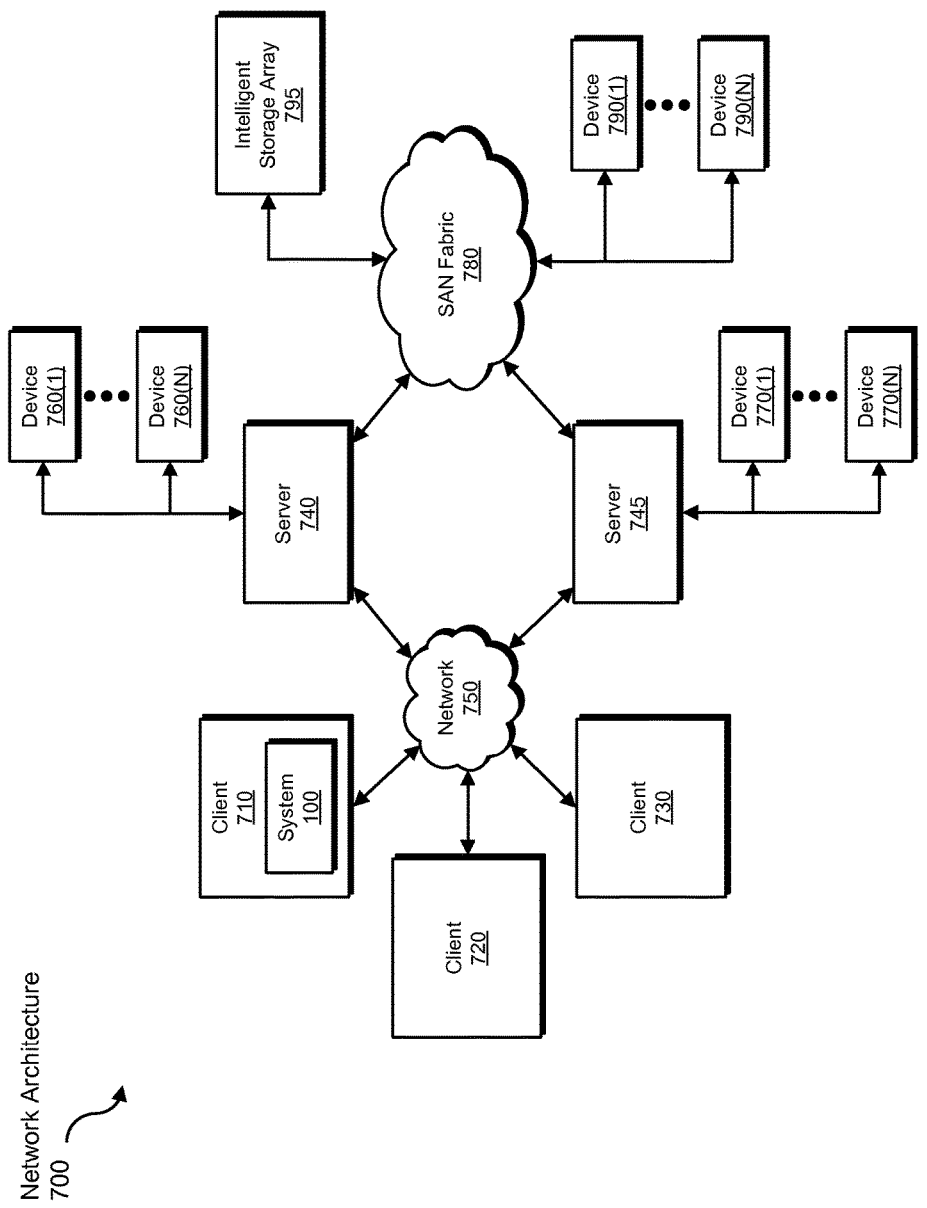
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for virtual machine boot disk restoration.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive restoration instructions to be transformed, transform the restoration instructions, output a result of the transformation to a storage proxy virtual machine, use the result of the transformation to restore virtual disk data, and store the restored virtual disk data to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for virtual machine boot disk restoration, at least a portion of the method being performed by a computing device comprising at least one processor, the method comprising:
    identifying a hypervisor that hosts at least one virtual machine, wherein a replication system is configured to replicate virtual machine data stored by the virtual machine, including a virtual machine boot disk used by the virtual machine, to a data repository that is separate from the hypervisor;
    determining that the replication system is to restore the replicated virtual machine data back to the hypervisor for the virtual machine, including boot disk data replicated from the virtual machine boot disk;
    attaching, at the hypervisor, the virtual machine boot disk to a storage proxy virtual machine hosted by the hypervisor;
    restoring, from the replication system and via the storage proxy virtual machine, the boot disk data replicated from the virtual machine boot disk back to the virtual machine boot disk.

2. The computer-implemented method of claim 1, wherein the replication system lacks direct access via a storage area network to a storage device that stores the virtual machine boot disk for the hypervisor.

3. The computer-implemented method of claim 1, wherein the replication system is configured to replicate virtual machine data stored by the virtual machine by communicating with the virtual machine.

4. The computer-implemented method of claim 1, wherein the virtual machine is offline when the replication system is to restore the replicated virtual machine data back to the hypervisor for the virtual machine, preventing the replication system from restoring at least a portion of the replicated virtual machine data via communication with the virtual machine.

5. The computer-implemented method of claim 1, wherein attaching, at the hypervisor, the virtual machine boot disk to the storage proxy virtual machine hosted by the hypervisor comprises bringing the storage proxy virtual machine online in response to determining that the replication system is to restore the replicated virtual machine data back to the hypervisor for the virtual machine.

6. The computer-implemented method of claim 1, wherein:
    the hypervisor hosts a plurality of virtual machines;
    the replication system is configured to replicate virtual machine data for each of the plurality of virtual machines, including a plurality of virtual machine boot disks;
    attaching the virtual machine boot disk to the storage proxy virtual machine comprises attaching the plurality of virtual machine boot disks to the storage proxy virtual machine.

7. The computer-implemented method of claim 1, further comprising:
    bringing the virtual machine online after restoring the boot disk data to the virtual machine boot disk;
    restoring at least a portion of the replicated virtual machine data from the replication system by communicating directly with the virtual machine.

8. The computer-implemented method of claim 1, further comprising restoring, from the replication system and via the storage proxy virtual machine, an additional portion of the replicated virtual machine data to an additional virtual machine disk.

9. The computer-implemented method of claim 1, wherein attaching, at the hypervisor, the virtual machine boot disk to the storage proxy virtual machine hosted by the hypervisor comprises creating, according to a storage networking protocol used by the replication system, a logical volume that maps onto the virtual machine boot disk.

10. The computer-implemented method of claim 1, wherein attaching, at the hypervisor, the virtual machine boot disk to the storage proxy virtual machine hosted by the hypervisor comprises connecting the virtual machine boot disk to the storage proxy virtual machine with a virtual storage interface adapter.

11. A system for virtual machine boot disk restoration, the system comprising:
    an identification module, stored in memory, that identifies a hypervisor that hosts at least one virtual machine, wherein a replication system is configured to replicate virtual machine data stored by the virtual machine, including a virtual machine boot disk used by the virtual machine, to a data repository that is separate from the hypervisor;
    a determination module, stored in memory, that determines that the replication system is to restore the replicated virtual machine data back to the hypervisor for the virtual machine, including boot disk data replicated from the virtual machine boot disk;
    an attachment module, stored in memory, that attaches, at the hypervisor, the virtual machine boot disk to a storage proxy virtual machine hosted by the hypervisor;
    a restoration module, stored in memory, that restores, from the replication system and via the storage proxy virtual machine, the boot disk data replicated from the virtual machine boot disk back to the virtual machine boot disk;
    at least one physical processor configured to execute the identification module, the determination module, the attachment module, and the restoration module.

12. The system of claim 11, wherein the replication system lacks direct access via a storage area network to a storage device that stores the virtual machine boot disk for the hypervisor.

13. The system of claim 11, wherein the replication system is configured to replicate virtual machine data stored by the virtual machine by communicating with the virtual machine.

14. The system of claim 11, wherein the virtual machine is offline when the replication system is to restore the replicated virtual machine data back to the hypervisor for the virtual machine, preventing the replication system from restoring at least a portion of the replicated virtual machine data via communication with the virtual machine.

15. The system of claim 11, wherein the attachment module attaches, at the hypervisor, the virtual machine boot disk to the storage proxy virtual machine hosted by the hypervisor by bringing the storage proxy virtual machine online in response to determining that the replication system is to restore the replicated virtual machine data back to the hypervisor for the virtual machine.

16. The system of claim 11, wherein:
the hypervisor hosts a plurality of virtual machines;
the replication system is configured to replicate virtual machine data for each of the plurality of virtual machines, including a plurality of virtual machine boot disks;
attaching the virtual machine boot disk to the storage proxy virtual machine comprises attaching the plurality of virtual machine boot disks to the storage proxy virtual machine.

17. The system of claim 11, wherein the restoration module further:
brings the virtual machine online after restoring the boot disk data to the virtual machine boot disk;
restores at least a portion of the replicated virtual machine data from the replication system by communicating directly with the virtual machine.

18. The system of claim 11, the restoration module restores, from the replication system and via the storage proxy virtual machine, an additional portion of the replicated virtual machine data to an additional virtual machine disk.

19. The system of claim 11, wherein the attachment module attaches, at the hypervisor, the virtual machine boot disk to the storage proxy virtual machine hosted by the hypervisor by creating, according to a storage networking protocol used by the replication system, a logical volume that maps onto the virtual machine boot disk.

20. A non-transitory computer-readable medium comprising one or more computer-readable instructions that, when executed by at least one processor of a computing device, cause the computing device to:
identify a hypervisor that hosts at least one virtual machine, wherein a replication system is configured to replicate virtual machine data stored by the virtual machine, including a virtual machine boot disk used by the virtual machine, to a data repository that is separate from the hypervisor;
determine that the replication system is to restore the replicated virtual machine data back to the hypervisor for the virtual machine, including boot disk data replicated from the virtual machine boot disk;
attach, at the hypervisor, the virtual machine boot disk to a storage proxy virtual machine hosted by the hypervisor;
restore, from the replication system and via the storage proxy virtual machine, the boot disk data replicated from the virtual machine boot disk back to the virtual machine boot disk.

* * * * *